Nov. 15, 1949 A. L. THURSTON 2,488,347
ELECTRICAL COMPRESSION MEASURING DEVICE
Filed Sept. 12, 1945
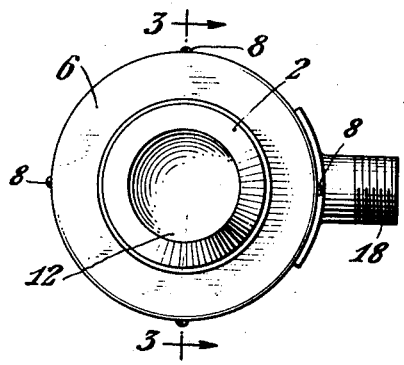
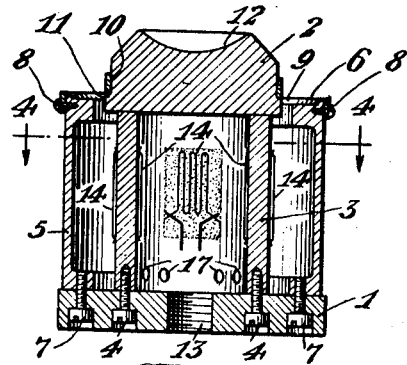
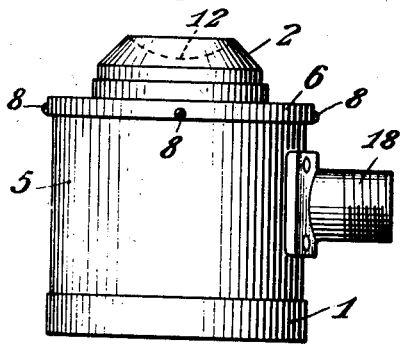
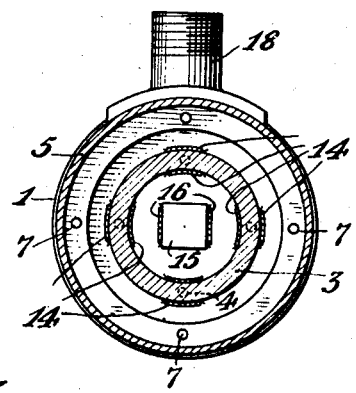
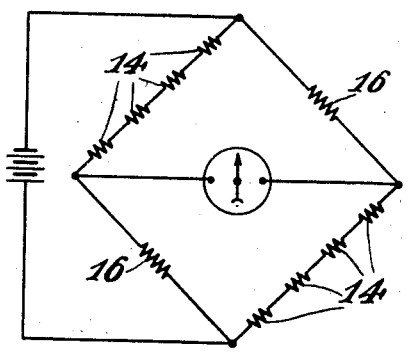
INVENTOR
ARTHUR L. THURSTON
BY Ward, Crosby & Neal
ATTORNEYS Patented Nov. 15, 1949

2,488,347

UNITED STATES PATENT OFFICE 2,488,347

ELECTRICAL COMPRESSION MEASURING DEVICE

Arthur L. Thurston, Wantagh, N. Y., assignor to Cox & Stevens Aircraft Corporation, Mineola, N. Y., a corporation of New York Application September 12, 1945, Serial No. 615,864

6 Claims. (Cl. 201—63)

This invention relates to apparatus for measuring compression forces, being particularly adapted for weighing apparatus, among other possible uses.

In its preferred form, the invention may be embodied in a cell or capsule-like device, adapted to be inserted between any suitable support and an object to be weighed. The cell may embody strain gages such for example as of the electrical resistance type, together with an arrangement of parts such that the strain variations indicated by these gages are preferably directly proportional to the weight variations to which the cell is subjected, or else the strain variations accurately follow some predetermined relationship with respect to said weight variations. For purposes of weighing aircraft, vehicles, etc., the device for example, may be placed on top of a jack or any other support in a position to receive the weight to be measured. For cases such as for platform scales, a plurality of the devices may be located at suitably spaced points to receive the platform or other weight-receiving member.

The invention provides a simple form of construction which is small in size, and conveniently arranged so as to make possible the use of strain gages of the electrical resistance type or other types such as those which change the capacity, inductance, magnetic characteristics, frequency, etc., of circuit or device in response to the strains being measured. The invention makes possible the measurement of a wide range of weights up to many thousands of pounds, and with an exceptionally high degree of accuracy.

The cell or capsule-like device in which the strain gages are contained may be either of a portable form, or adapted to be fixed in position, and the necessary accessory equipment for measuring the electrical resistance variations (in case resistance type strain gages are used) may all be conveniently carried from place to place in a suitcase, together with one or more of the cells, connection wires and accessories therefor. Thus relatively inexpensive equipment is provided which is easy to operate under a variety of conditions such as where expensive platform scales have previously been required or where no convenient and inexpensive form of accurate weighing apparatus has been made available heretofore.

According to the invention, a pair of spaced members are provided between which a hollow cylindrical column is interposed and, according to a preferred form of the invention, a series of electrical resistance type strain gages are bonded at spaced points around the inside wall surface of the column at points intermediate its ends, and also another plurality of such gages may be bonded at corresponding points around the outside surface of the column. This arrangement of the gages on the hollow cylindrical column has certain important advantages in insuring accuracy of the device, as will be hereinafter explained.

The weight of the load to be measured may be applied to one of said spaced members, such weight being distributed among the elements of the hollow cylindrical column and applied to the other spaced member acting as a support. The end surfaces of the column are ground and the surfaces of the spaced members contacting therewith are accurately finished so as to insure uniform contact. The lower end of the column is preferably fixed to said support by a plurality of spaced means which hold the parts together, each with a predetermined tension so that any strains set up in the column by such securing means are substantially symmetrical about the column. The upper one of the spaced members which receives the weight of the load, is preferably held down on the upper end of the column by means such as a surrounding casing structure having a flexible annular ring or cover portion at the top, which applies a slight pressure uniformly around the periphery of the weight-receiving member to normally urge it into contact with the upper surfaces of the column uniformly around its upper end or edge.

Various further and more specific objects, features and advantages of the invention will clearly appear from the detailed description given below taken in connection with the accompanying drawings which form a part of this specification and illustrate by way of example a preferred form of the invention. The invention consists in such novel features and combinations of parts as may be shown and described in connection with the apparatus herein disclosed.

In the drawings:

Figs. 1 and 2 respectively are top and side views showing the exterior of a preferred form of weighing cell embodying the invention;

Fig. 3 is a vertical sectional view taken substantially along line 3—3 of Fig. 1;

Fig. 4 is a horizontal sectional view taken substantially along line 4—4 of Fig. 3; and Fig. 5 is a diagram of a simplified form of electrical connections including a bridge circuit and indicating instrument for indicating the responses of the strain gages in the device.

Referring to the drawings in further detail, the cell may consist of a relatively rigid base member or plate 1 and another relatively rigid member or top plate 2, and between these members there is interposed a tubular strain-receiving element 3, preferably in the form of a hollow cylindrical column. The lower end of this column may be attached to the base member 1 by means such as a plurality of screws 4 located preferably at uniformly spaced points about the lower end edge of the column and passing up through the base member into the column. When each of these screws is put in place, a screw driver is preferably used of a type which will apply only a predetermined limited rotational force, or a type which will indicate the force, so that all the screws may be tightened under substantially uniform tension, and thus any strains in the column which may be set up by reason of the attaching screws, will be substantially symmetrical about the column.

The top member or plate may be held in contact with the column 3 by a shell or casing structure 5 having at its top an inwardly directed flexible annular ring 6. The main part of the casing 5 may comprise a relatively rigid hollow cylindrical member formed at its lower edge with an inwardly directed rigid flange which is secured to the base member 1 at a plurality of spaced points as by screws 7. The flexible annular ring 6 may be formed at its periphery with a downwardly directed flange, which is secured to the main body of the casing or shell 5 either by a drive fit or by means such as drive screws 8. The flexible ring 6 may be of such thickness, which may vary depending upon the size of the cell, as to deform vertically a slight amount on the application of a small force to the inner edge thereof. Such inner edge as shown may be formed with a relatively rigid upwardly directed flange 10 within which the top plate member 2 may be fitted with a light press fit. As shown, the lower peripheral edges of the member 2 may be formed with a shoulder 11 against which the flanged inner edges of the flexible ring 6 may bear.

When the casing retaining screws 7 are tightened, the parts are preferably of such dimensions that the top plate member 2 is pulled down against the tubular column 3, thereby placing a small initial load on the column by reason of the yielding pressure resulting from a slight deformation of flexible ring 6. Thus, this flexible ring in conjunction with the remaining portions of the casing, holds the top plate member 2 firmly in contact with the tubular column and in position for preventing lateral displacement of the member 2 if the load should be applied thereto at an angle to the vertical center line of the cell. This construction insures that the members 2 and 3 will be kept at all times in the same proper uniform contact with the result that when even a small force or load is applied, the device will respond accurately in the manner hereinafter explained, and without the casing structure acting in any way to modify the desired responses.

The deformation in vertical directions of the flexible ring 6 may be made to extend over virtually its entire width by providing a slight clearance space 9 between the flexible ring and the upper edge of the shell 5, which may be formed with a rigid inwardly directed flange as shown. This clearance may be obtained by slightly undercutting this flange and all but the extreme outer upper edge of the wall of the shell 5.

The top plate member 2 may be provided with a depression 12 preferably conforming as shown to a spherical surface to receive the force or weight to be measured and to assist in directing such force toward the axis of the cell in case eccentric loads should be applied. Means such as a threaded hole 13 may be provided in the base member 1 for purposes of attaching and holding the cell in place on any desired supporting structure.

In use, the cell may be either placed on or fastened to a supporting structure and the force or weight to be measured is applied to the top plate member 2, thus causing the column 3 to be compressed between the two spaced plate members 1 and 2. Any side component of force or weight may be carried by the shell 5 in conjunction with the flexible ring 6, so that the vertical displacement of plate member 2 with relation to base member 1, and the compression of tubular member 3, are both proportional to the component of the force or weight directed along the central axis of the cell.

The various parts of the cell are so designed that in the normal use of the cell for loads within the limits for which it is designed, the stresses of its various members and particularly the tubular column 3 are below the elastic limit or yield point of the material used. Accordingly the resulting deformation or strain of the column according to Hooke's law is proportional to the applied force or weight. Likewise, the displacement of plate member 2 with respect to the base 1 is proportional to such force or weight. Therefore, in order to measure the amount of force or weight, it is only necessary to measure the deformation or strain of column 3, or the displacement of plate member 2 with respect to base member 1.

Accurate means for measuring such deformation, strain or displacement are available in various types of strain gages and the necessary accompanying indicating equipment. With the particular embodiment of the invention shown, electrical resistance type strain gages are used by bonding several of the same, preferably both to the inside and outside surfaces of the hollow column member 3, as shown in Figs. 3 and 4 at 14.

As shown in Fig. 4, a "dummy" unstressed column 15 may be attached to the mid portion of the base member 1. (This has been omitted for clearness in Fig 3.) The dummy column 15 is somewhat shorter than tubular column 3 so that the top plate member 2 will at no time touch its upper end. Dummy or inactive gages are attached to the column 15. As is the common practice with electrical resistance type strain gages, the active and dummy gages may be connected in a bridge circuit, one simple form of which is shown in Fig. 5. The active gages 14 may be connected in two opposite arms of the bridge, while the dummy gages 16 are placed in the other two opposite arms of the bridge. Changes of temperature which affect all gages alike, cause no unbalancing of the bridge, while changes in resistance of the active gages 14 due to deformation of the column 3 will unbalance the brige, the amount by which the bridge is unbalanced being a measure of the applied force or weight, and also a measure of the displacement downwardly of plate member 2.

Small holes 17 may be provided in tubular member 3 through which connecting wires for the inner strain gages may pass. A quick-detachable plug of any suitable known form may be provided at 8 on the shell 5 to provide electrical connections to the measuring or indicating unit.

As shown, each of the active strain gages 14 on the interior wall surface of the column may be accompanied by another of the gages located at the corresponding area on the outside wall surface of the column and such gages may be connected in series. This arrangement tends to afford results of improved accuracy, in that irregularities in the response of one of the gages, say on the outer wall surface, will tend to be compensated by corresponding irregularities in the opposite sense, occurring in the response of the accompanying gage on the inside wall surface.

While the invention has been described in detail with respect to a particular preferred example, it will be understood by those skilled in the art after understanding the invention, that various changes and further modifications may be made without departing from the spirit and scope of the invention, and it is intended therefore in the appended claims to cover all such changes and modifications.

What is claimed as new and desired to be secured by Letters Patent is:

1. Strain measuring apparatus comprising a strain-receiving element in the form of a tubular column, a pair of electrical resistance type strain gages bonded respectively to the inside and outside wall surfaces thereof, and an electrical circuit in which said gages are connected in series, such circuit being adapted for connection to resistance measuring apparatus for indicating strains to which said column is subjected.

2. Strain measuring apparatus comprising a strain-receiving element in the form of a tubular column, a pair of electrical resistance type strain gages bonded at substantially the same location respectively to the inside and outside wall surfaces of said tubular column, and an electrical circuit in which both gages are so connected that an inaccurate and excessive response from one will tend to compensate for an inaccurate and insufficient response from the other, such circuit being adapted for connection to resistance measuring apparatus for indicating strains to which said column is subjected.

3. Strain measuring apparatus comprising a strain-receiving element in the form of a hollow cylindrical member, a series of electrical resistance type strain gages bonded at spaced points around the interior wall surface of said hollow member at positions intermediate its ends, and another series of like gages each connected with a gage of the first-named series and bonded respectively at corresponding points on the outside surface of said member.

4. In apparatus for measuring compression forces, an assembly including two spaced members and column means interposed therebetween, a casing structure rigidly secured to one of said members and surrounding said column means, and means for securing said casing structure to the other of said members comprising a flexible annular ring positioned in a plane generally perpendicular to said column means, the outer edge of said ring being rigidly secured to said casing structure and the inner edge being rigidly secured to said other member in a position to exert a slight initial predetermined pressure on said other member in a direction urging same into contact with said column means.

5. In apparatus for measuring compression forces, an assembly including two spaced members and column means interposed therebetween, a casing structure rigidly secured to one of said members and surrounding said column means, and means for securing said casing structure to the other of said members comprising a flexible annular ring positioned in a plane generally perpendicular to said column means, the outer peripheral edge of said ring being secured to said casing structure, the remainder of said ring being spaced from the casing structure to enable the ring to flex without contact with the casing structure except at said peripheral edge, and the inner edge of said ring being secured to said other member.

6. In apparatus for measuring compression forces, an assembly including two spaced members and column means interposed therebetween, a casing structure rigidly secured to one of said members and surrounding said column means, and means for securing said casing structure to the other of said members comprising a flexible annular ring positioned in a plane generally perpendicular to said column means, the outer edge of said ring being secured to said casing structure and the inner edge being formed with a flange having a forced fit with said other member, said ring being positioned to exert a slight initial predetermined pressure on said other member in a direction urging same into contact with said column means.

ARTHUR L. THURSTON.

REFERENCES CITED

The following references are of record in the file of this patent:

UNITED STATES PATENTS

| Number | Name | Date |
|---|---|---|
| 2,183,078 | Kemler | Dec. 12, 1939 |
| 2,327,935 | Simmons | Aug. 24, 1943 |
| 2,362,589 | Simmons | Nov. 14, 1944 |
| 2,396,916 | Guthrie | Mar. 19, 1946 |
| 2,405,199 | Faust et al. | Aug. 6, 1946 |
| 2,420,148 | Ostergren | May 6, 1947 |
| 2,421,907 | Postlewaite | June 10, 1947 |